E. D. MACKINTOSH.
METHOD OF DRIVING ELECTRIC CENTRIFUGAL MACHINES.
APPLICATION FILED NOV. 11, 1918.
1,342,405.
Patented June 1, 1920.
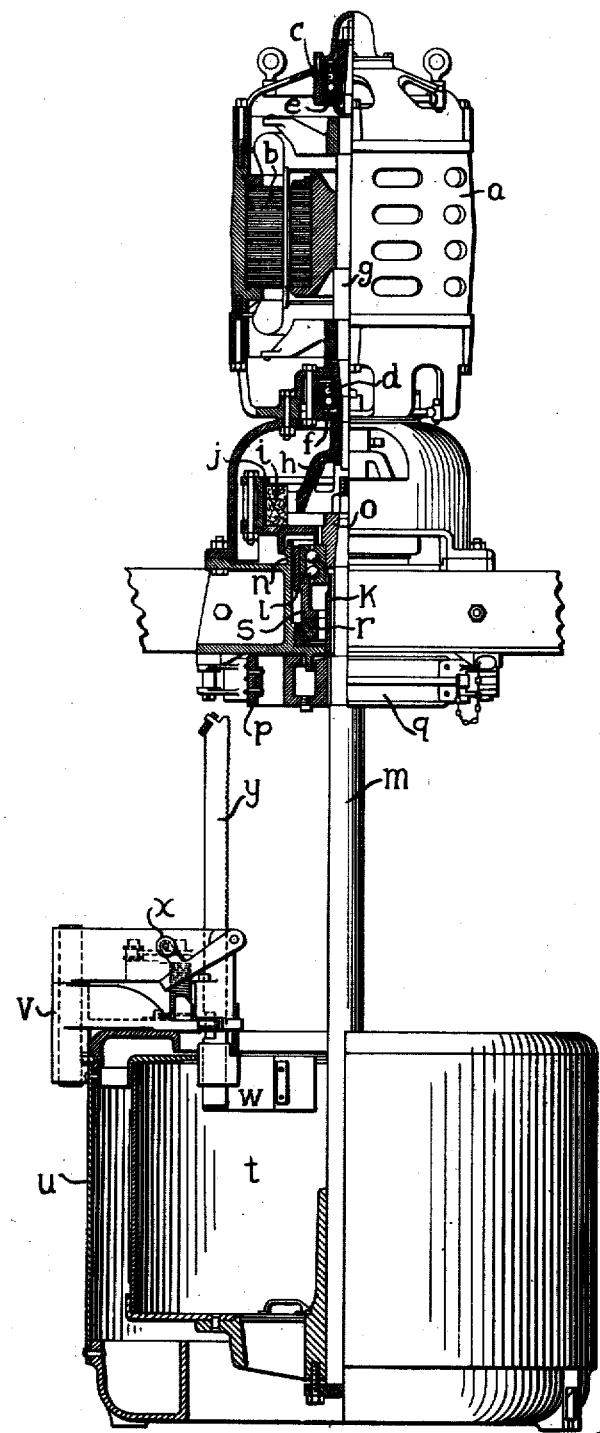
INVENTOR
EDWARD D.
MACKINTOSH
BY
ATTORNEYS

UNITED STATES PATENT OFFICE.

EDWARD D. MACKINTOSH, OF BROOKLYN, NEW YORK, ASSIGNOR TO S. S. HEPWORTH COMPANY, OF NEW YORK, N. Y., A CORPORATION OF NEW YORK, AND EDITH M. MACKINTOSH, OF BROOKLYN, NEW YORK.

METHOD OF DRIVING ELECTRIC CENTRIFUGAL MACHINES.

1,342,405.     Specification of Letters Patent.     Patented June 1, 1920.

Application filed November 11, 1918. Serial No. 262,051.

*To all whom it may concern:*

Be it known that I, EDWARD D. MACKINTOSH, a citizen of the United States, residing at Brooklyn, in the county of Kings and the State of New York, have invented an Improved Method of Driving Electric Centrifugal Machines with Mechanical Unloaders.

Centrifugal machines are run at a high speed, the most popular size making about 1000 revolutions per minute when drying sugar whereas they must make only about 20 while being discharged by means of mechanical unloaders. The problem is, to obtain these two speeds with a centrifugal machine driven by an electric motor, especially by an induction motor. It is entirely impracticable to get the two speeds by braking down the induction motor from the higher speed or by giving it two windings. One reason that they can not be had by braking down from the higher speed is, that the rush of current, at the lower speed, would be too great for the motor to stand. This could be reduced by the use of a transformer, but the field would still be rotating at the higher speed while the rotor would be at the lower speed. This would result in objectionable heating if, indeed, the motor would stand it at all.

As for two windings, it is practically impossible to make two so dissimilar as to give anything like two speeds so far apart as 20 and 1000.

I achieve the desired result by using a two speed motor and employing the form of drive that connects the motor to the centrifugal machine by means of a centrifugal friction clutch. This well known form of drive has blocks, resting loosely in a cup secured to the spindle of the centrifugal machine, that are revolved in the cup by means of a driver secured to the spindle of the motor and that are held to frictional contact with the inside of the cup by centrifugal force. In practice I find that it works well to run the motor at half the speed, for driving the machine against the unloader, that is used while it is doing its work. Half the speed means one quarter of the centrifugal force and of the resulting frictional grip of the blocks on the cup. One quarter the torque at one half the speed results in no objectionable heating or rush of current and the reduced frictional grip of the blocks is sufficient, or more than sufficient, to drive the centrifugal machine against the unloader. When just sufficient, the speed of the machine can be kept down to the 20 revolutions or so, desired, by the braking effect of the unloader itself, the motor continuing to run at one half of its maximum speed while the blocks slip in the cup. When more than sufficient, the extra braking effect required, to keep the speed down, is had by means of the brake forming part of every centrifugal machine.

In the accompanying drawing a centrifugal machine is shown partially in vertical section, in which my invention is embodied in one form.

As here illustrated, the electric motor, generally indicated by the reference $a$, has its winding $b$ (for either direct or alternating current) of such nature as to afford a multiple speed drive, preferably one at about 1200 R. P. M., and the second at about 600 R. P. M. The motor shaft $g$ is vertical and runs in upper and lower ball bearings $c$ and $d$ located in oil chambers $e$ and $f$ respectively.

At the lower end of the motor shaft $g$, and below the bearing $d$ is secured one element, viz., the spider $h$, of a centrifugal clutch. The spider carries a group of swinging or sliding blocks $i$ which, when the motor is rotated, are thrown outward into engagement with the clutch ring $j$. The latter is bolted to the clutch plate $o$, which in turn is clamped rigidly to the head of the shaft $m$ of the centrifugal basket $t$. The relation of the clutch blocks $i$ to the ring $j$ is such that they do not engage the latter until the motor is well under way, and even at the lower speed (600 R. P. M.) of the motor the torque exerted by the clutch is only about one fourth that exerted when the motor is at high working speed. The slip of the blocks on the ring at low speed of the motor is therefore a matter of no great moment from the standpoint of wear or overheating of these parts.

The support for the shaft $m$ of the centrifugal basket may be of any suitable construction, but is here shown as of the type disclosed in my copending application Ser.

No. 296,908 filed May 13, 1919. It comprises a ball bearing $l$ mounted in a cup $s$ which is supported in the frame of the centrifugal through the ball and socket joint $r$, so as to permit the basket $t$ to swing slightly.

The unloader plow $w$ is carried by bracket $v$ mounted on the centrifugal basket casing $u$, and is lowered and lifted by means of its rack bar $y$ engaged by a pinion on the shaft of the crank handle $x$. The usual brake drum $p$ is fast on the upper portion of the shaft $m$ and is engaged by the brake band $q$ in well understood manner to halt the basket when desirable.

The installation operates as above set forth. During the drying operation the motor is run at high speed (1200 R. P. M.). When the material is dried and the valve in the bottom of the basket has been opened to permit its discharge, the motor is run at low speed (600 R. P. M.). When the discharger plow $w$ is swung by the operator into engagement with the material lining the interior of the basket, it exerts a drag upon the latter which causes the friction clutch to slip, and thus drops the speed of revolution to that convenient for unloading (about 20 R. P. M.). The extent of the drag thus exerted by the plow is wholly under the control of the operator, since the more rapidly the plow is lowered the greater the drag, and vice versa. By a proper manipulation of the plow the necessary regulation of the drag is attained to secure the proper discharge speed of revolution of the basket. Of course the operator may at any time resort to the additional control afforded by the brake, but this is not ordinarily required.

The structural details illustrated and described merely indicate a suitable embodiment of what I claim as my invention, the scope of the latter being in no way limited thereby.

I claim—

1. A centrifugal machine comprising a multispeed electric motor, a centrifugal basket or the like, a friction clutch drive connection between the motor and the basket, the low speed drive of the motor exceeding a proper unloading speed, in combination with an unloader serving by its drag on the material in the basket to cause the friction clutch to slip and thus to reduce the speed of the basket to one suitable for unloading, substantially as described.

2. In a centrifugal machine of the type specified in claim 1, a friction clutch of the centrifugal type.

3. In a centrifugal machine of the type specified in claim 1, a two-speed motor, the lower speed being about half the high speed, and a centrifugal friction clutch exerting at low speed only about a quarter of the torque exerted at high speed, substantially as described.

EDWARD D. MACKINTOSH.